(12) United States Patent
Sinnott et al.

(10) Patent No.: US 6,332,272 B1
(45) Date of Patent: Dec. 25, 2001

(54) METHOD OF REPAIRING A TURBINE BLADE

(75) Inventors: Zachary Sinnott, Winter Park; Kevin D. Smith, Oviedo; John E. Junkin, Orlando, all of FL (US); Kevin Updegrove, Carson City, NV (US); Michael F. Foster, Carson City, NV (US); Daniel Lovelace, Carson City, NV (US)

(73) Assignees: Siemens Westinghouse Power Corporation, Orlando, FL (US); Chromalloy Gas Turbine Corporation, Orangeburg, NY (US)

( * ) Notice: Subject to any disclaimer, the term of this patent is extended or adjusted under 35 U.S.C. 154(b) by 0 days.

(21) Appl. No.: 09/479,789

(22) Filed: Jan. 7, 2000

(51) Int. Cl.[7] ..................................... B23P 15/00
(52) U.S. Cl. .................. 29/889.1; 29/889.72; 29/402.08
(58) Field of Search .............................. 29/889.1, 889.72, 29/889.721, 889.2, 402.03, 402.08, 402.09, 402.11, 402.13; 228/119

(56) References Cited

U.S. PATENT DOCUMENTS

| 4,073,599 | 2/1978 | Allen et al. . |
| 4,487,550 | 12/1984 | Horvath . |
| 5,106,010 | 4/1992 | Stueber et al. . |
| 5,374,319 | 12/1994 | Stueber et al. . |
| 5,822,852 | * 10/1998 | Bewlay et al. ...................... 29/889.1 |
| 6,049,978 | * 4/2000 | Arnold ............................... 29/889.1 |

* cited by examiner

*Primary Examiner*—I Cuda Rosenbaum

(57) ABSTRACT

A method for repairing a turbine blade (10) wherein the tip (16) of the blade is removed (41,43) and a replacement cap is attached by welding (49). The cap may consist of a plate (48) attached by welding and a squealer (54) formed by depositing weld material (52), as illustrated in FIG. 3. The plate and/or squealer may be formed from a material different from the material of the airfoil portion (42) of the blade in order to optimize the performance of the blade.

20 Claims, 3 Drawing Sheets

METHOD OF REPAIRING A TURBINE BLADE

BACKGROUND OF THE INVENTION

This invention relates generally to the field of turbine blades, and more particularly to the field of the repair of the tip portion of turbine blades.

FIG. 1 illustrates a turbine blade 10 as is known in the prior art for use in power generating turbines, such as in the first row of blades of a gas or combustion turbine. Turbine blade 10 includes a blade root 12, an airfoil portion 14, and a tip portion 16. The blade root 12 is designed to be inserted into and retained by a disc on a rotating shaft (not shown) of the turbine. Airfoil portion 14 is shaped to extract energy from combustion gases passing over the airfoil portion 14, thereby imparting rotating mechanical energy to the turbine shaft. For modern gas turbine engines, airfoil portion 14 is designed to include one or more cooling passages formed below the surface of the airfoil for the passage of cooling air necessary to insure the integrity of the blade material in the hot combustion gas environment. Such cooling passages may be formed in a forged blade by a drilling process or may be formed directly in a cast material blade. For cast turbine blades, the cooling passages are formed by supporting a ceramic core within the volume of the mold as the material of the blade is cast. In order to support the ceramic core in its proper position during the casting process, it is necessary to extend a portion of the core to the edge of the casting, thereby creating one or more openings in the tip portion 16 of the as-cast blade. These openings must then be sealed during the fabrication of the blade in order to assure the proper flow of the cooling air within the turbine blade 10. If the size of the opening is sufficiently small, it may be sealed by a weld plug 18 formed on the tip 16 of the blade 10. For larger openings it may be necessary to cover the opening with a cap such as one or more plates 20 in order to seal the opening. U.S. Pat. No. 4,073,599 issued on Feb. 14, 1978, to Allen et al. describes such a blade tip closure design, and it is incorporated by reference herein. Plates 20 are mechanically restrained by the structure of the blade tip 16 and are held in position and sealed by one or more brazed joints 21. It may be appreciated that the assembly and brazing of plates 20 can be a difficult and expensive process. Furthermore, in spite of efforts to maintain the core in its proper position during the casting process, many cast blades are rejected due to a minimum wall violation caused by unintended movement of the core resulting in an end of a cooling passage being located proximate a surface of a tip end of the airfoil of the blade.

Turbine blade 10 is designed to rotate within a casing (not shown). It is important for the blade tip 16 to fit precisely within the casing in order to minimize the passage of combustion gases around the blade tip 16, since such bypass gases impart no energy to the airfoil section 14. The blade tip 16 is provided with a squealer 22 which is a raised lip extending around the periphery of the blade tip 16. Squealer 22 gets its name from the sound that is produced in the event of a mechanical interference between the blade tip 16 and the casing. Ideally the squealer 22 is sized to fit within the casing without rubbing but with a minimum of space there between.

It is known that turbine blades 10 may develop one or more cracks 24 near the tip 16 of the blade 10 due to low cycle fatigue stresses imparted on the blade tip 16 during the operation of the turbine. If a crack 24 extends beyond a critical dimension, the turbine blade 10 must be removed from service and/or repaired in order to prevent catastrophic failure of the blade and turbine. It can be appreciated that a crack 24 may be repaired by removing the material adjacent to the crack 24 to form a crack repair volume, and then filling the crack repair volume with weld metal. However, the presence of braze joint 21 utilized to secure plates 20 in position can complicate the repair process, since weld integrity is adversely affected when applied over a braze material.

In light of the limitations of the prior art designs, it is desirable to provide a method for repairing a cracked hollow turbine blade which overcomes the problems associated with the presence of braze material in the proximity of the cracked area. It is also desired to provide a method of manufacturing a hollow turbine blade that precludes the possibility for a repair in the area of a braze joint. Furthermore, it is desired to provide a turbine blade having improved level of performance to prevent the occurrence of cracks near the blade tip.

SUMMARY OF THE INVENTION

These and other objects of the invention are met in a method of repairing a turbine blade, the blade having a plurality of cooling passages formed therein extending to a tip of the blade, the blade further having a cap brazed over an end of a cooling passage at the tip and a squealer portion extending beyond the cap, the method including the steps of: removing the squealer portion, cap, and all braze material from the blade to form a repair surface on the tip; forming a replacement cap sized to span the plurality of ends of the cooling passages; attaching the replacement cap to the repair surface by welding to seal the cooling passage ends; forming a replacement squealer portion by welding

DETAILED DESCRIPTION OF THE INVENTION

Figure 1:
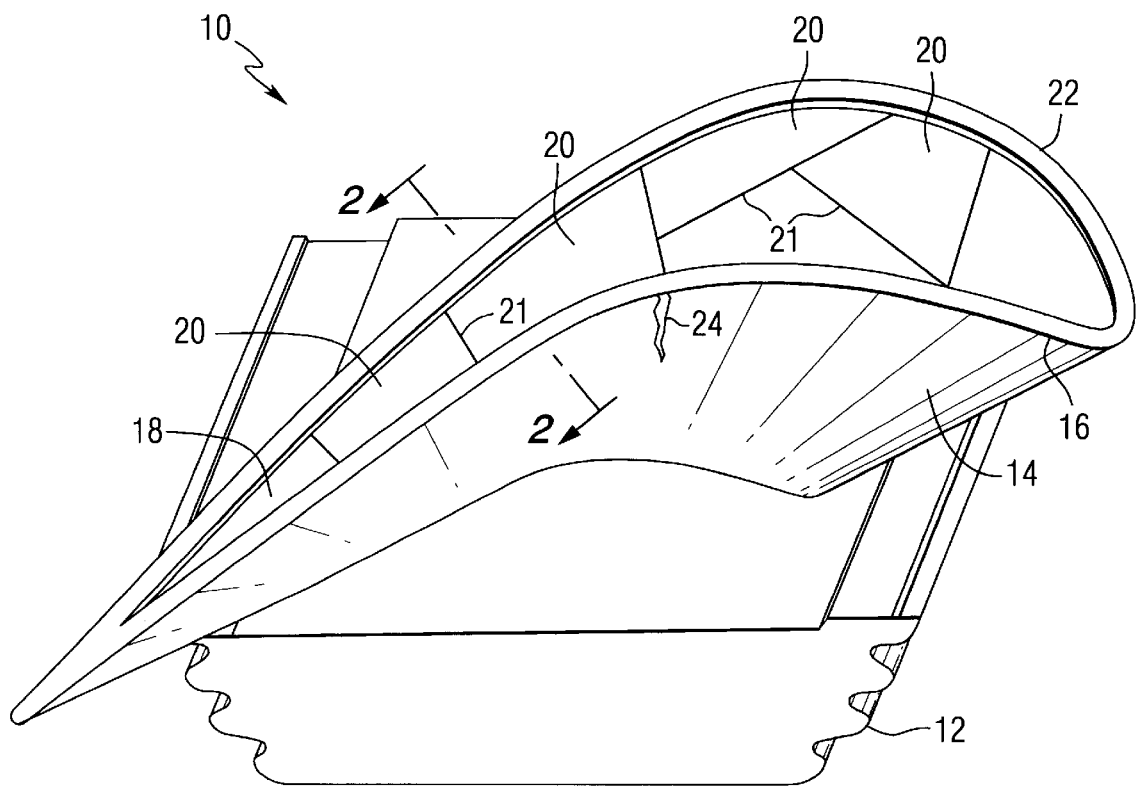
FIG. 1 is a perspective view of a prior art turbine blade having a crack formed in the tip thereof.
Figure 2:
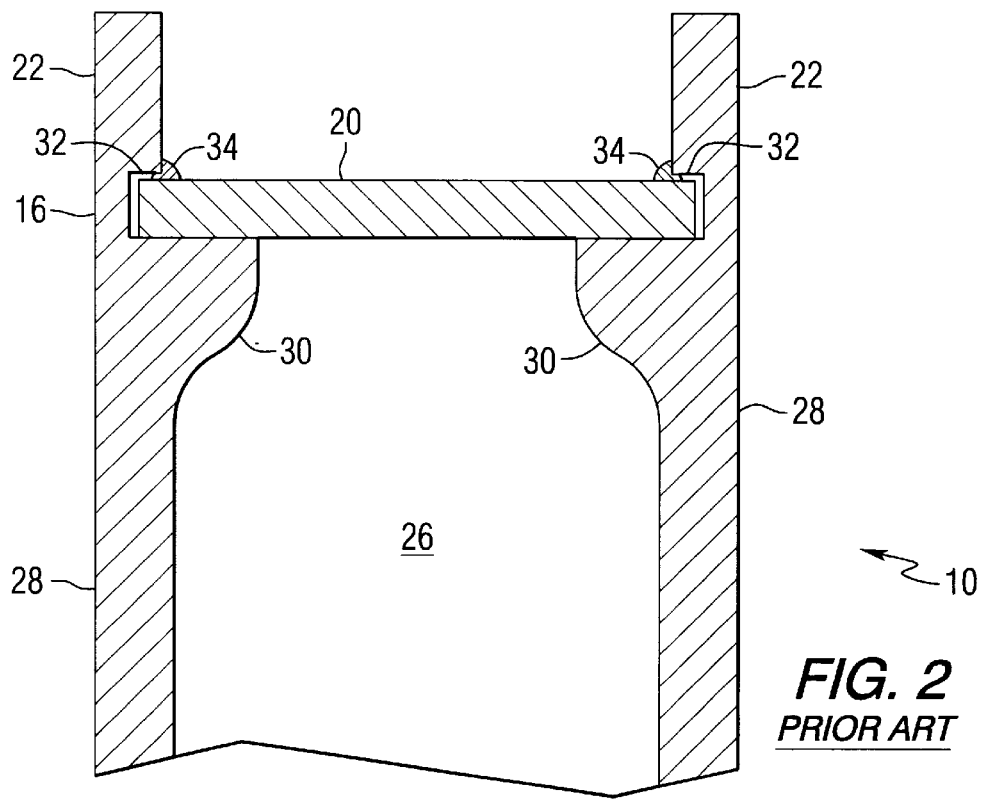
FIG. 2 is a partial sectional view of the turbine blade of FIG. 1.

FIG. 2 illustrates a partial sectional view of the prior art turbine blade 10 of FIG. 1 as seen along section 2—2 of FIG. 1. Plate 20 and squealer 22 are seen in sectional view in FIG. 2. For the embodiment shown, the walls 28 of the turbine blade 10 are integrally cast with the squealer portion 22. A ceramic core (not shown) is in place during the casting process to form cooling passage 26, as well as to form the internal webs 30. The notches 32, within which plate 20 is retained, are formed by machining slots into the internal webs 30. Braze material 34 is utilized to hold plate 20 in position within notches 32. Notches 32 provide a reactive force to counteract the forces imposed upon plate 20 during the operation of the turbine into which the blade 10 is installed. As described above, a crack 24 illustrated in FIG. 1 may extend to portions of blade 10 containing the brazed material 34.

Figure 3:
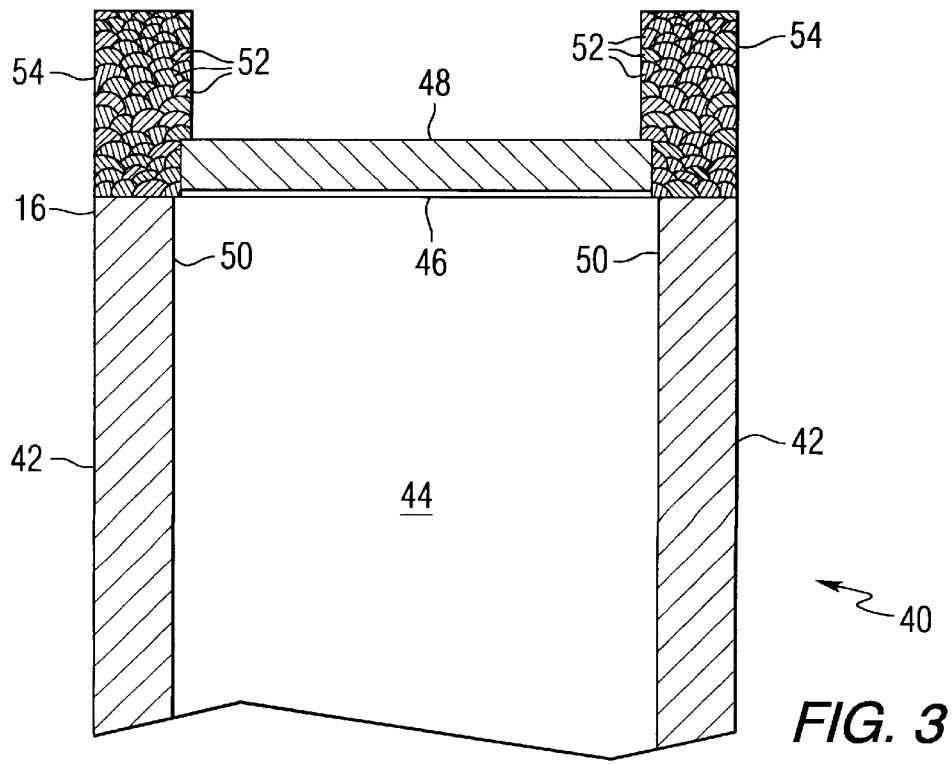
FIG. 3 is a partial sectional view of a turbine blade illustrating a repair made in accordance with the present invention.
Figure 4:
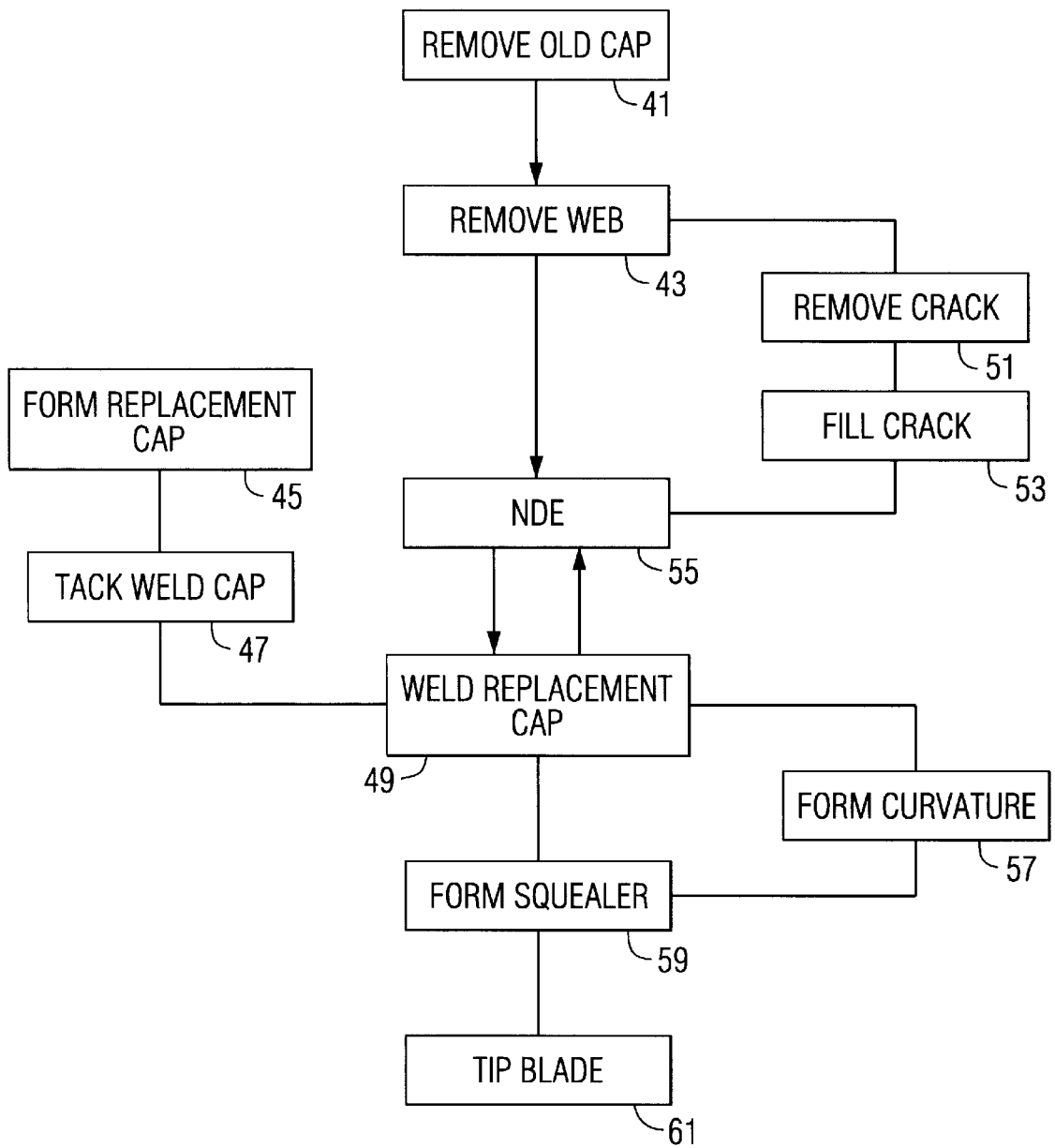
FIG. 4 is a schematic representation of the steps of a method for repairing a turbine blade in accordance with the present invention.

FIG. 3 illustrates a turbine blade 40 manufactured or repaired in accordance with the present invention. The walls 42 of blade 40 correspond to the walls 28 of blade 10 of FIG. 2. Walls 42 form a portion of the boundary of a cooling passage 44 that is formed during the casting of the blade 40. These portions of blade 40 may be formed during the manufacturing of a new blade or may be the result of a partial repair process to a blade 10 taken out of service from a turbine. In accordance with the present invention, blade 10 of FIG. 2 may be repaired to become blade 40 of FIG. 3 by a sequence of steps illustrated schematically in FIG. 4. The first step 41 is to remove the squealer 22, cap plate 20, and all brazed material 34 from blade 10. The removal of these structures results in the formation of a repair surface 46 on the tip 16 of blade 40. The repair surface 46 is preferably flat and will expose the ends of each of the cooling passages 44. If the blade 10 had been rejected for a minimum wall violation, it may be possible to remove sufficient material to remove the portion of the blade 10 containing the minimum wall violation. The webs 30 of FIG. 2 are removed in step 43 to improve thermal characteristics at the tip and so that the webs 30 will not interfere with the ability to obtain a successful weld. In addition, removal of the webs 30 will expand the size of the opening of cooling passages 44 on repair surface 46. By improving the access to cooling passage 44, the inside surfaces 50 of the walls 42 become more accessible for nondestructive examination (NDE). It may be appreciated that the prior art blade designs utilize a web to minimize the core print opening at the tip of the blade, thereby making it easier to close the core print holes, either by attaching a plate by brazing or by welding to form a plug if the core print hole is small enough. A significant amount of effort is currently being expending in the casting industry to minimize core print hole size. However, the web material at the tip of the blade makes it more difficult to cool the tip of the blade. The current invention eliminates the problems associated with having a web for both newly manufactured and repaired blades.

A replacement cap, illustrated in FIG. 3 as plate 48, is then formed in step 45 to span cooling passage 44. Advantageously, a single plate 48 may be used to cover a plurality or all of the cooling passages 44 formed in blade 40 since the repair surface 46 is a single flat surface across the entire cross section of the blade 40. In this manner, the multiple plate design of the prior art blade 10 illustrated in FIG. 1 is eliminated. The plate 48 may be sized to span passage 44 leaving just a small gap between the edges of plate 48 and the edges of airfoil walls 42 to facilitate the subsequent welding process discussed below.

The material of plate 48 is chosen to facilitate the welding of the plate to the airfoil walls 42. In one embodiment the blade 40 is formed of a cast nickel-based super alloy such as IN-738LC, and both the plate 48 and the weld material 52 used to secure the plate onto the repair surface 46 are selected to be the same material as the blade 40. For a typical gas turbine row 1 blade, plate 48 may be in the range of 0.060–0.100 inches in thickness. Plate 48 may be held in place by mechanical means or by a tack weld as shown in step 47 of FIG. 4 before it is welded to the repair surface 46 in step 49. In one embodiment of the present invention, the welding process utilized in step 49 is a high temperature TIG welding process. The applicants have found that for blades cast either conventionally, directionally solidified, or as a single crystal from either IN-738, Mar M247, or CM 247LC material, a pre-heat and an in-process welding temperature of between 1,650–1,950 degrees Fahrenheit will provide acceptable results. If a tack weld is used in step 47, the tack weld and its heat affected zone are consumed during the welding of step 49 in order to obtain the more desirable material properties associate with a high-temperate TIG welding process.

In the event that the original blade 10 that is repaired to form blade 40 had developed one or more cracks 24, as illustrated in FIG. 1, the repair process may include step 51 of removing material adjacent the crack 24 to form a crack repair volume, and step 53 of filling the crack repair volume by welding. Step 55 indicates that nondestructive examination of the blade 40 may be conducted before or after the welding of the replacement cap and/or the repair of any cracks that may be present. For a newly manufactured blade, it may be appreciated that steps 41,43,51,53 are not necessary, but are replaced by the manufacturing of a new blade body including airfoil section 42 as shown in FIG. 3.

In some applications, it may be necessary or desirable to conduct step 57 of forming a curved surface on the top surface of plate 48. Step 59 indicates that a replacement squealer portion 54 is formed by a welding process wherein layers of weld material are deposited to form the general shape of squealers 54. Conventional or laser welding may be utilized for step 59. Step 61 indicates that the final shape of the blade tip 16 and squealers 54 are formed by a process such as final machine, grinding, EDM, or other material shaping process.

In one embodiment of the present invention, the step 59 of forming the squealer portion may be performed using a weld filler material that is different than the weld filler material utilized in step 49 of welding the replacement cap 48 onto repair surface 46. The material selected for the root 12 and airfoil 14 sections of a turbine blade are primarily selected for their high temperature, high stress, creep properties. However, the tip 16 portion of a turbine blade 40 experiences a different set of operating perimeters than the lower portions of the blade, and failures in the tip portion 16 are usually the result of low cycle fatigue, oxidation and corrosion. Therefore, it may be desirable to select the material for plate 48 and/or replacement squealers 54 to have different properties than airfoil walls 42.

The above described embodiments of the present invention are provided by way of illustration, not limitation. Accordingly, the full scope of the applicants' invention is as claimed below.

We claim as our invention:

1. A method of repairing a turbine blade, the blade comprising a plurality of cooling passages having respective ends formed therein extending to a tip of the blade, the blade further comprising a cap brazed over an end of a cooling passage at the tip and a squealer portion extending beyond the cap, the method comprising the steps of:

removing the squealer portion, cap, and all braze material from the blade to form a repair surface on the tip;

forming a replacement cap sized to span the plurality of ends of the cooling passages;

attaching the replacement cap to the repair surface by welding to seal the cooling passage ends;

forming a replacement squealer portion by welding.

2. The method of claim 1, wherein the blade has a crack formed in the tip thereof, and further comprising the steps of:

after the step of removing the squealer, cap, and all braze material, removing material adjacent the crack to form a crack repair volume; and filling the crack repair volume by welding.

3. The method of claim 2, further comprising the step of performing a nondestructive examination of the tip after the step of filling the crack repair volume and prior to the step of attaching the replacement cap.

4. The method of claim 1, wherein at least one of the cooling passages comprises a web portion formed proximate the cap, the method further comprising the step of removing the web portion prior to the step of attaching the replacement cap.

5. The method of claim 4, further comprising the step of performing a nondestructive examination of the tip after the step of removing the web portion.

6. The method of claim 1, wherein the step of removing the squealer, cap, and all braze material comprises machining a flat surface on the blade tip.

7. The method of claim 1, wherein the blade comprises a cast nickel based super alloy material, and wherein the step of attaching the replacement cap comprises welding the replacement cap to the repair surface using a high temperature TIG welding process.

8. The method of claim 1, wherein the blade comprises a cast nickel based super alloy material, and wherein the step of forming a replacement cap comprises forming the replacement cap of the same material as the blade material, and wherein the step of attaching the replacement cap comprises welding the replacement cap to the repair surface using a high temperature TIG welding process using filler material that is the same material as the blade and replacement cap material.

9. The method of claim 1, wherein the step of attaching the replacement cap further comprises:

holding the replacement cap in position with a tack weld;

welding the replacement cap to the repair surface using a high temperature TIG welding process;

consuming the tack weld heat affected zone during the high temperature TIG welding process.

10. The method of claim 1, wherein the step of attaching the replacement cap is performed using a first weld filler material and the step of forming a replacement squealer is performed using a second weld filler material.

11. The method of claim 1, wherein the step of forming a replacement squealer comprises forming the squealer by utilizing a laser weld process.

12. The method of claim 8, wherein the high temperature TIG welding process comprises a preheat and an in-process welding temperature of between 1,650–1,950 degrees Fahrenheit.

13. The method of claim 9, wherein the high temperature TIG welding process comprises a preheat and an in-process welding temperature of between 1,650–1,950 degrees Fahrenheit.

14. A method of manufacturing a turbine blade, the method comprising the steps of:

forming a blade root and airfoil portion from a directionally solidified columnar grained cast material;

forming a cap from a conventionally cast material;

welding the cap onto an end of the airfoil portion.

15. The method of claim 14, wherein the cap comprises a plate, and further comprising the step of forming a squealer on the end of the airfoil portion by welding.

16. A method of repairing a turbine blade, the blade comprising an airfoil section having a plurality of cooling passages formed therein, the blade having been rejected due to a minimum wall violation caused by an end of a cooling passage being located proximate a surface of a tip end of the airfoil, the method comprising:

removing a portion of the tip end of the airfoil to eliminate the portion containing the minimum wall violation and to form a repair surface;

attaching a cap to the repair surface by welding.

17. The method of claim 16, wherein the cap comprises a plate, and further comprising the step of forming a squealer extending beyond the plate by welding.

18. The method of claim 16, further comprising the step of forming a curved surface on the plate prior to the step of forming a squealer.

19. The method of claim 16, wherein the step of attaching a cap by welding comprises using a high temperature TIG welding process.

20. The method of claim 19, wherein the high temperature TIG welding process comprises a preheat and an in-process welding temperature of between 1,650–1,950 degrees Fahrenheit.

* * * * *